Dec. 27, 1938.  W. J. ROBINSON  2,141,364
PROCESS OF PRECOOKING LEGUMINOUS FOOD PRODUCTS
Original Filed March 3, 1936
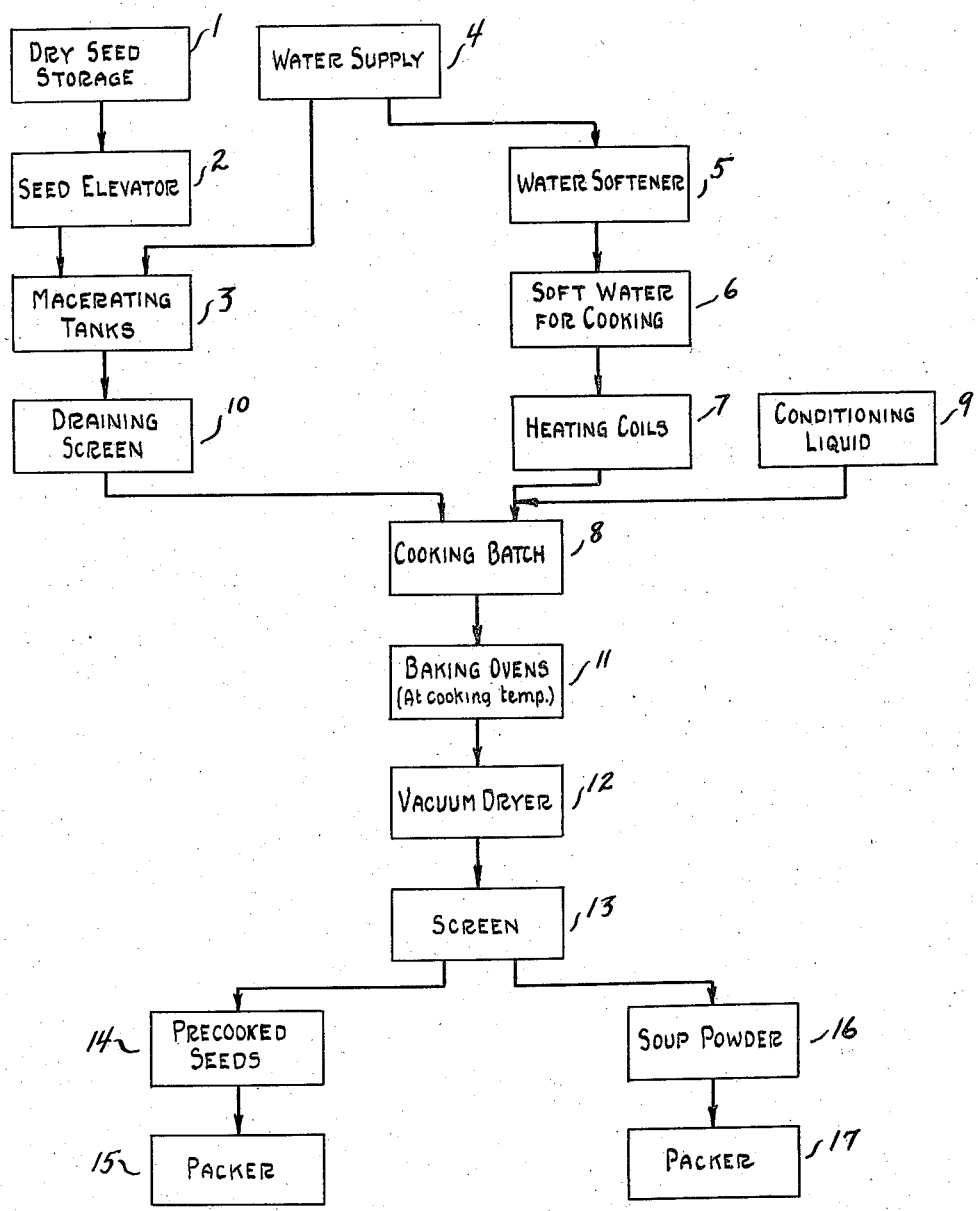
Inventor
WALTER J. ROBINSON
By Semmes & Semmes
Attorneys Patented Dec. 27, 1938

2,141,364

UNITED STATES PATENT OFFICE 2,141,364

PROCESS OF PRECOOKING LEGUMINOUS FOOD PRODUCTS

Walter J. Robinson, Ann Arbor, Mich., assignor of one-third to Charles H. Stocking and one-third to Carlos A. Reading, both of Ann Arbor, Mich.

Application March 3, 1936, Serial No. 66,902
Renewed May 4, 1938

13 Claims. (Cl. 99—98)

My invention relates to food products and more particularly to a process for precooking leguminous and similar seed products.

Precooked leguminous products prepared according to prior processes possess certain undesirable characteristics. The most important of these characteristics are the shrivelled appearance, unappetizing color, and taste of steam in the final product. These defects are imparted to the vegetables due to the manner in which they are cooked and dried.

Most of the existing processes cook the seeds under steam pressure in a pressure cooker. Inasmuch as individual batches of the seeds vary as to the length of time necessary for their cooking, they should be inspected from time to time during the cooking period. However, cooking under steam pressure does not permit such inspection. In view of this, batches of seeds are often destroyed by improper cooking.

In most of the prior processes the precooked seeds are dried by passing a current of warm air over them. The ultimate result of such drying is that the outside of the seeds dry first, which causes the seeds to crack and shrivel, thereby giving them an unappetizing appearance.

Furthermore, no attempt has heretofore been made to prevent the breaking or shiveling of the seeds or to improve the outward appearance thereof, such as for instance by the use of a conditioning agent.

One of the objects of my invention is to overcome the undesirable characteristics of precooked leguminous products prepared according to the existing processes.

Another object of my invention is to provide a process for precooking leguminous products which can be easily and cheaply carried out.

A still further object of my invention is to provide a process for precooking leguminous products in which the products can be readily inspected during the cooking stage.

Yet another object of my invention is to provide a process for precooking leguminous seeds whereby the products will present the approximate outward appearance of raw seeds.

A still further object of my invention is to provide a process for precooking leguminous products in which a suitable conditioning agent is employed for improving the characteristics of the precooked products.

Yet another object of my invention is to provide a process for precooking leguminous products in which a caramel solution is used as a conditioning agent for the products.

A still further object of my invention is to provide pre-cooked leguminous food products which can be prepered for table use in from fifteen to twenty-five minutes' time.

In order to make my invention more clearly understood, I have diagrammatically shown in the accompanying drawing the steps for carrying the same into practical effect without limiting the improvements in their useful applications to the particular procedure which, for the purpose of explanation, has been made the subject of illustration.

For the purpose of simplicity of description, I shall describe my process as applied to navy beans, it of course being understood that any other naturally occurring seeds can be prepared in a similar manner.

In carrying out my process, the raw dried beans are conveyed from a suitable storage bin 1 by means of a seed elevator 2 to macerating or soaking tanks 3. The cold water necessary for the maceration of the beans is supplied from a source of water 4.

The quantity of water used for the macerating step is such as to completely cover the beans and leave a layer of water above them. I have found that better results are obtained when water in excess of the amount necessary for causing the beans to swell to their maximum size after soaking for the required length of time is used.

The beans are left in the macerating tanks for a period of from ten to twelve hours at ordinary room temperature. This soaking of the beans serves to swell and soften the beans and thus better prepare them for the subsequent cooking.

The beans are then drained of the water by passing them to a suitable draining screen or the like 10. It will be readily appreciated that the beans are now ready for the cooking operation.

I prefer that the water used for the cooking step be distilled water or water having the greater portion of its naturally occurring solid constituents removed by an appropriate method of softening.

For example, water from the supply source 4 is subjected to a softening step in a conventional water softening apparatus 5. The softened water is then removed to suitable vats 6. The cooking water is then brought to a boiling temperature by the employment of heating coils or other suitable heating apparatus 7. It should be noted that the water is heated before the seeds are introduced therein.

A conditioning solution is also introduced into the cooking water prior to the immersion of the seeds therein. As a conditioner I employ an acid-fast caramel solution of not more than 1 percent. I wish it to be understood that this solution does not influence the flavor of the beans in any perceptible degree, but prevents their cracking or shrivelling when dried.

The caramel is preferably prepared from sucrose of either the beet or cane variety. However, other sources of sugar may be employed.

The caramel solution is made by using ammonium sulfate and hydrochloric acid in small quantities in the sugar solution which is caramelized by means of an oil bath at a temperature of from 180 to 200° C.

While I have described the preferred caramel conditioning solution, it is of course to be understood that other caramel solutions may be used.

I have found that the addition of the acid-fast caramel solution greatly improves the physical condition of the beans upon drying. The beans do not shrivel or crack as much as they would in processes where such a conditioner is not used. Furthermore, this conditioner assures a stable color to the finished products when they are recooked for consumption.

While I have shown the conditioner as being introduced into the cooking water prior to the immersion of the seeds therein, the conditioning solution can be added at other desirable points, such as during the cooking. After the caramel solution and the boiling water have been introduced into a suitable cooking pan or the like 8, the beans are then introduced therein.

Sufficient cooking water is employed in each pan so that at no time during the cooking operation will the water line in the pan fall below the surface of the beans.

The beans are placed in fine mesh wire containers the same size as the cooking pans for the cooking step.

The pans holding the beans and the cooking solution are then placed in baking ovens 11 for cooking. Every effort should be used to prevent cooling of the ovens at the time the batch is placed in them.

The beans are kept in the ovens from one and a half to two hours at a temperature ranging from 175 to 200° F., at the end of which time the beans are properly cooked. It is believed apparent that the time of cooking and the temperature ranges will vary with the particular batch being cooked. However, the containers can be readily inspected at all times during the cooking and the danger of improper cooking is thereby reduced to a minimum.

After the beans have been cooked, they are drained of the hot water by removing the fine mesh containers from the pans and the containers are then introduced into suitable vacuum driers 12. The vacuum driers should operate at about 28 inches of vacuum and at a temperature of from 100 to 110° F. The degree of vacuum is to be sufficient to prevent the beans from cracking, breaking or shrivelling and will allow them to remain at a temperature so low that the surfaces will not harden by the heat and the inside moisture will then be prevented from escaping.

The beans are kept in the vacuum drier until they are finally desiccated to a moisture content of approximately 12 to 14%.

After the beans have been dried, there is produced a precooked product which has virtually the identical shape and general appearance of the original raw beans.

When the beans leave the driers they are removed to a suitable screening apparatus 13. The beans to be used as whole beans are transferred to a storage compartment 14. The beans can then be conveyed to the packing apparatus 15, in which they can be put into the desired containers.

In the event the beans are to be used as a base for soups or the like, they are removed to a suitable grinding apparatus 16 where they are ground into a powder. The powder may then be put up in suitable packages in a packing apparatus 17 for use by the consuming public.

It will be appreciated from the foregoing that precooked leguminous products prepared according to my invention will possess the outward characteristics of the raw seeds. Moreover, the employment of the caramel conditioning solution will prevent the cracking or shrivelling of the product and thereby assure an appetizing final product. Furthermore, the leguminous food products can be prepared for table use in from fifteen to twenty-five minutes. The seeds can be either marketed whole or else ground into a powder which makes an excellent base for soups or the like.

While I have shown and described the preferred embodiment of my invention, I wish it to be understood that I do not confine myself to the precise details of procedure herein set forth, by way of illustration, as it is apparent that many changes and variations may be made therein, by those skilled in the art, without departing from the spirit of the invention, or exceeding the scope of the appended claims.

I claim:

1. A process for the preparation of precooked leguminous food products which consists in macerating the products in water, removing the water and adding a caramel solution prior to the cooking of the products.

2. A process for the preparation of precooked leguminous food products which consists in macerating the products for approximately twelve hours in water, removing the water, adding a caramel solution to the products and cooking the products for approximately two hours.

3. A process for the preparation of precooked leguminous food products which consists in macerating the products in water for approximately twelve hours, removing the water, adding a caramel solution to the products and cooking the products at approximately 175° F. for from one and a half to two hours.

4. A process for the preparation of precooked leguminous food products which consists in macerating the products in water for from ten to twelve hours, removing the water, adding an acid-fast caramel solution to the products and cooking the products at approximately 175° F. for from one and a half hours to two hours.

5. A process for the preparation of precooked leguminous food products which consists in macerating the products in water from ten to twelve hours, removing the water, adding a weak solution of caramel in water to the products and cooking the products at approximately 175° F. for from one and a half to two hours.

6. A process for the preparation of precooked leguminous food products which consists in macerating the products in water for from ten to twelve hours, removing the water, adding a cooking solution of water and an acid-fast caramel to the products, cooking the products at approximately 175° F. and drying the products in a vacuum.

7. A process for the preparation of precooked leguminous food products which consists in macerating the products in water, removing the water, adding a caramel solution to the products, and cooking the products from one and one-half to two hours.

8. A process for the preparation of precooked leguminous food products which consists in macerating the products in water for from ten to twelve hours, removing the water, adding a cooking solution of water and an acid-fast caramel to the products, cooking the products at approximately 175° F., for from one and one-half to two hours, and drying the products in a vacuum.

9. A process for the preparation of precooked leguminous food products which consists in macerating the products in water for approximately twelve hours, removing the water, adding a caramel solution to the products and cooking the products at approximately 175° F. to 200° F. for from one and a half to two hours.

10. A process for the preparation of precooked leguminous food products which consists in macerating the products in water for from ten to twelve hours, removing the water, adding an acid-fast caramel solution to the products and cooking the products at approximately 175° F. to 200° F. for from one and a half hours to two hours.

11. A process for the preparation of precooked leguminous food products which consists in macerating the products in water from ten to twelve hours, removing the water, adding a weak solution of caramel in water to the products and cooking the products at approximately 175° F. to 200° F. for from one and a half to two hours.

12. A process for the preparation of precooked leguminous food products which consists in macerating the products in water for from ten to twelve hours, removing the water, adding a cooking solution of water and an acid-fast caramel to the products, cooking the products at approximately 175° to 200° F. and drying the products in a vacuum.

13. A process for the preparation of precooked leguminous food products which consists in macerating the products in water for from ten to twelve hours, removing the water, adding a cooking solution of water and an acid-fast caramel to the products, cooking the products at approximately 175° to 200° F. for from one and one-half to two hours, and drying the products in a vacuum.

WALTER J. ROBINSON.